8954X

A. Miner.

Pump Brake.

Patented July 7, 1835.

NO PRINTED COPY OF SPECIFICATION IN OFFICE.

($3 for drawing) July 7. 1895

Amoz Miner. Eldbridge New York

8954X Letters Patent

Figure 1:
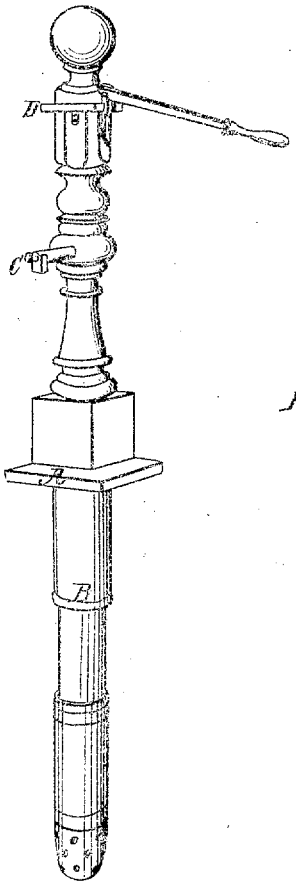
Figure 2:
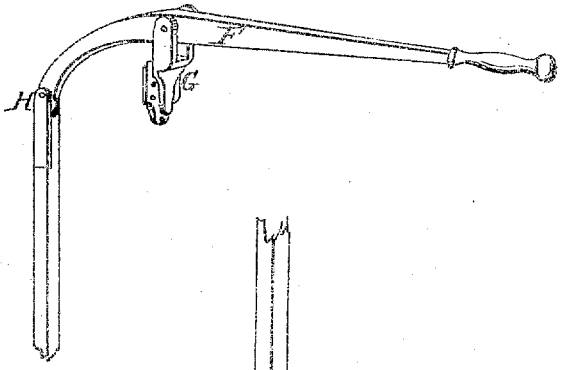
Figure 2:
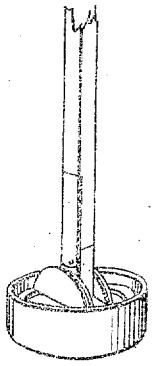

The Schedule referred to in the Letters Patent and making part of the same
containing a description in the words of the said Amoz Miner himself of the
improvement in Water Pumps To all whom these Presents shall come. Be it Known that I
Amoz Miner of the Town of Eldbridge, County of Onondaga and State of New
York have invented a new and useful improvement in Water Pumps and
that the following is a full and exact description thereof. The working cyl-
inder in which the plunger or piston operates, is made of cast iron except in
cases when the the fountain from which the pump draws is liable to become fre-
quently dry in which case a composition formed of zinc and Block tin
is preferable on account of its being less liable to rust. The size of the cylinder for
ordinary purposes is nine inches long and four inches diameter turned out
and polished on the inside. The piston is of the same ~~metal~~ with the cyl-
inder it is two inches long 1/4 inch thick turned and polished so as to fit the
inside of the cylinder. A little below the middle and around the inside of
the piston is a lip or shoulder projecting inward 1/4 inch across the centre is a bar 5/8
inch thick and 7/8 inch wide faced off on the upper side even with the lip, for
the valves to rest upon. The piston valves are made of leather which is satura-
ted with "Fawcetts chemical water proof paste" and covered with metallic plates
in the usual form excepting that instead of screws the plates are secured to the
leather by brass or iron pins which are made to fit the holes through the plates
so closely as not to require riveting. The valves are hung and fastened to the bar
of the Piston by an iron brace in the form of an inverted T which is laid on
the valves along the centre of the bar so that the stem or upright part of the ⊥
rises perpendicularly 1 1/2 inches from the face side and centre of the of the bar
and is hung by a pin to the lower end of the piston Rod which is made
forked for the purpose of receiving it. Two screws passing up through the bar
and leather into the brace secure the whole together and the valves are thus hung in the centre. The plate fig. 1. represents the form of the pump. The hight
from the base A to the cap under the urn is 3 feet. it is 7 inches square at
the base and tapered to 6 inches diameter at the top. In the lower end of
this stock is a female screw 3 inches ~~in~~ diameter, cut up longitudinally 3¾
inches in order to receive the male screw formed on the upper end of the low
er pipe. a groove one inch deep and 4 inches diameter is cut around the
female screw in order to receive the iron band to secure the joint. The base A is 1¼
inch thick 10 inches wide and 14 inches long chamfered down about half its thick
ness at the out edges. In the centre is a hole formed of the same diameter with the
female screw in the lower end of the stock The male screw of the pipe passes through
the base and is screwed into the stock which secures the base at the joint. The cylinder
is connected with the pipe below the base at B. a cavity is formed in the end of
the pipe of a size suitable to receive the cylinder one inch longitudinally. it is
[illegible] with the composition hereafter described for the inner coating to the pipe and
the cylinder is placed within it. and confined by banding around the pipe. The spout
C is of cast iron 5 inches long. 2 inch bore inside. having a male screw cut
at the end by which it is secured to the stock. a lip in the under side exten
ding downward at the out end of the spout forms an aperture through which the
water is discharged. The cap D. which is one and a fourth inches thick. hav-
ing a mortise through the centre of a size suitable for the brake and piston rod
to pass through and being secured to the bottom of the urn is fastened down
upon the top of the stock by screws. passing through the ears which are fastened
opposite each other to the top of the stock. The upper part of the ears has
a horizontal projection of 3/4 inch through which the screw passes perpendicu-
larly by which the cap and urn are readily secured to or detached from the stock
Fig. 2. letter F represents the brake of the pump which is made of iron except-
ing a short wooden handle which is banded and driven on at the end. The
fulcrums or braces G. is constructed with two ears at the top 1/2 inches apart
and the brake is hung between them by the fulcrum pin which passes through
them all. The dots on each side of the fulcrum are the holes for securing it to
the stock. The distance from the fulcrum pin to the pin which secures the upper end
of the Piston Rod at the end of the brake at H. is 5/8 inches. the brake in
that space being curved downward 20 degrees The object of the the curves

8954X

Figure 3:
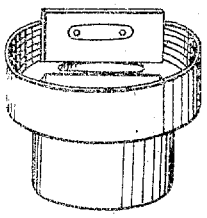

To answer in a more simple manner the same purpose of the wheel. The piston
rods may be made either of iron or hard wood. wooden rods when saturated
with the composition above mentioned for the inner coating of the pipe and connect
ed at the ends with iron attachments are preferable to iron. The pipe below the
cylinder which conveys the water from the well or fountain is attached to the
lower end of the cylinder by a connecting tube of cast iron. represented at fig 3.
The body of it is 3 inches long. it is three inches diameter and one fourth inch thick
it is secured to the wooden pipe in the same manner as the upper end of the
cylinder. The upper end of this tube is made sufficiently large by an offset to re-
ceive the cylinder by a screw. Within this tube are two apertures for the water to
pass through. formed by a bar one half inch wide across the centre. The leather
for the valves within it is cut the same diameter with the cylinder. So that the
cylinder when screwed down closely confines it which forms the hinges and the
valves open in the middle. The pipe for ordinary purposes is 4 inches diameter
made of light and porous wood of which white wood is very suitable. It is con-
nected together by means of a male and female screw made to fit each other of
½ inch thread. [illegible] longitudinally on the ends of the pipe to the distance of 3
inches. a small quantity of thick tar is spread on them and both are screwed
together to a joint. the end of the pipe however containing the female screw
should first be banded with common inch hoop iron. Elbows in the pipe may
be formed wherever necessary. by cutting the ends on such a bevel as when put
together will form the angle required. around the bore and in the joint of the elbow
thus formed is a ring of gum elastic or common india rubber. The elbow
is secured by two screwbolts which pass through both parts on each side of
the hole. at right angles with the joint. A strainer at the bottom of the pipe
is made of wood the same size with the pipe. It is 3 inches long having
a cavity of 3 inches diameter made within it. leaving a head at the lower
end which together with the sides is perforated with small holes. an inch band
on the lower end of the pipe is left extending half its width below to receive the
strainer and connect it to the pipe. In deep wells the cylinder should be placed
down to within about 20 feet from the bottom. and in all cases where it
is necessary to guard against frost the cylinder should be placed below the
platform so that a metallic drain can be inserted in the pipe above the cyl.

under and sufficiently below the base to receive no injury from frost. The inside of the pipe is saturated with a composition of two thirds pitch of a similar resinous substance and one third beeswax. these are melted together and poured through the pipe while hot as may be without injury to the materials. the pipe being elevated at one end for that purpose and kept gradually rolling while the composition passes through it until the whole inner surface of the pipe is saturated and coated over. A cheaper composition for the outside of the pipe is made of pitch and a small proportion of fat. the pipe is placed over a fire prepared for that purpose and kept gradually rolling while the composition is spread on in its hot state with a brush - the moment it is spread equally over a given distance, it is laid down and rolled in a bed of sand standing near for that purpose. These operations are repeated until the whole outside is coated over. The main object of the sand is to prevent its sticking to the hands while handling it. Another method of saturating the pipe is having a boiler constructed for that purpose. to immerse it in the composition in its hot state. and let it remain until it is sufficiently saturated outside and inside. What I claim as my own invention and not previously known in the above described machine is 1st The general construction of the pump 2nd The application of the fit of the metallic piston to the cylinder of said pump. 3d The application of the screw for connecting the wooden pipe or tube 4th the manner of constructing the elbows of the pipe 5th the application of the resinous composition to the pipe or tube Witnesses
C. William Porter Jr.
Lyman H. Mason Amos Minor (1856 words)

(Drawing)